M. G. CLAYTON.
MEANS OR APPARATUS FOR DETERMINING AND INDICATING STRESS IN METAL BODIES.
APPLICATION FILED DEC. 24, 1909.
996,314.
Patented June 27, 1911.
7 SHEETS—SHEET 1.
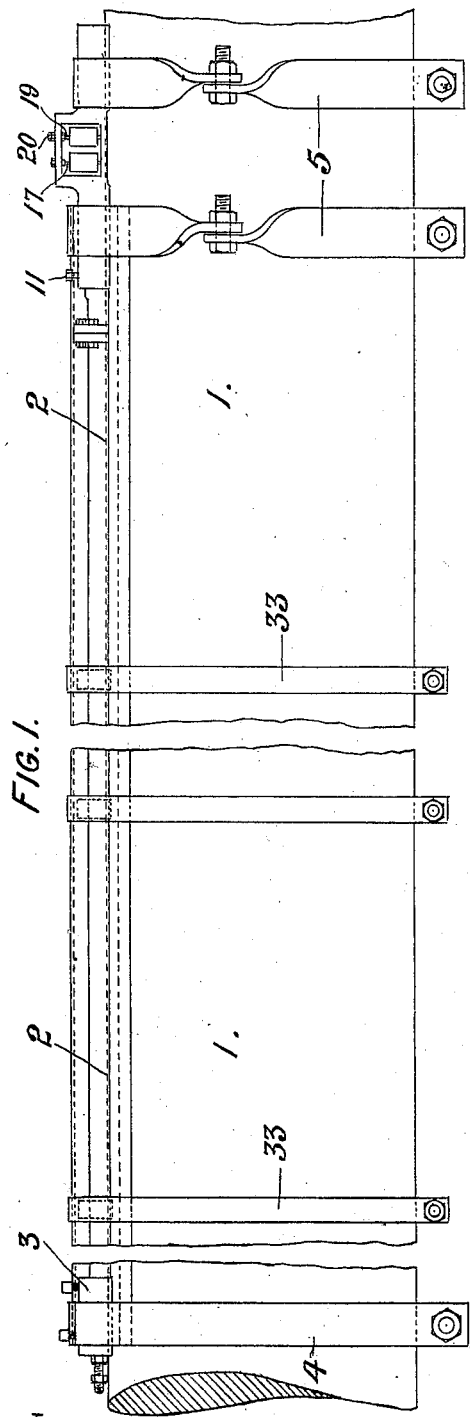
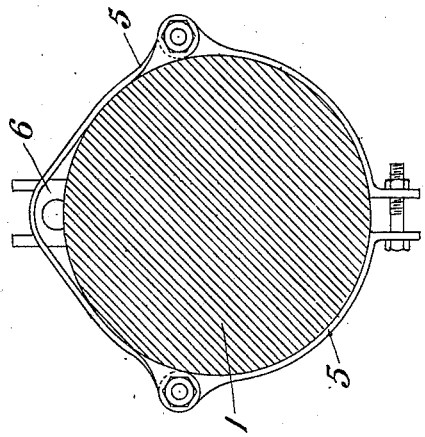
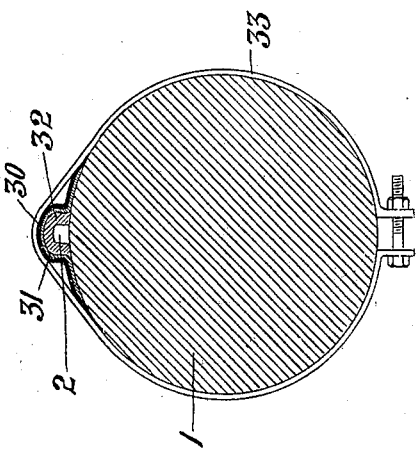
Inventor
Melville Graham Clayton M. G. CLAYTON.
MEANS OR APPARATUS FOR DETERMINING AND INDICATING STRESS IN METAL BODIES.
APPLICATION FILED DEC. 24, 1909.
996,314.
Patented June 27, 1911.
7 SHEETS—SHEET 2.
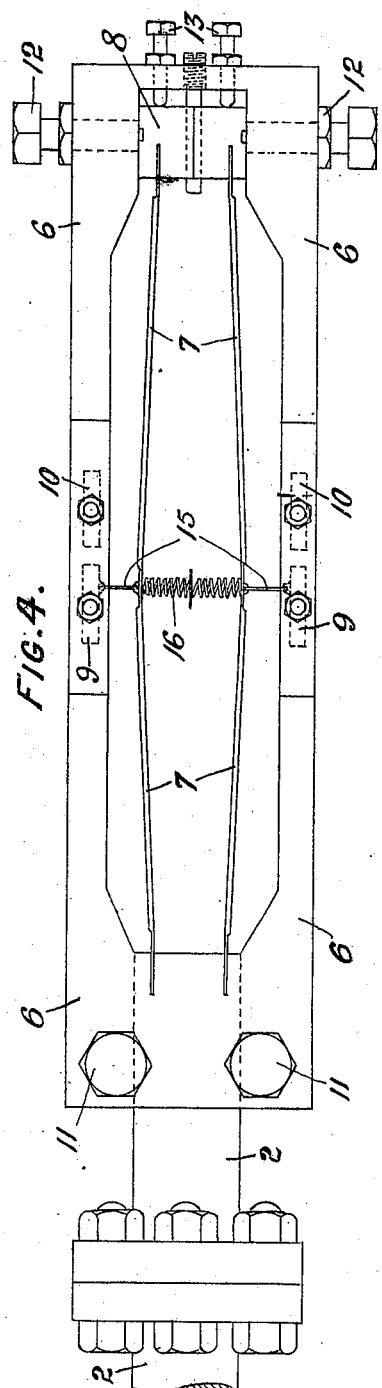
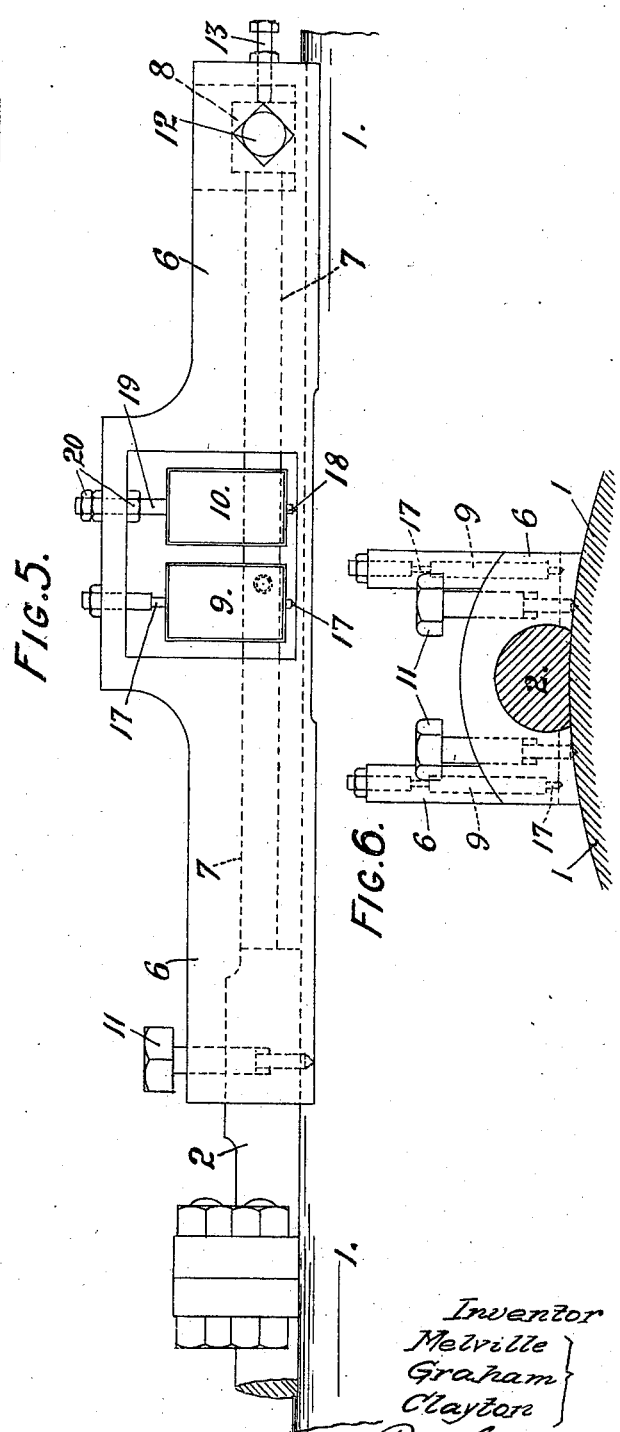

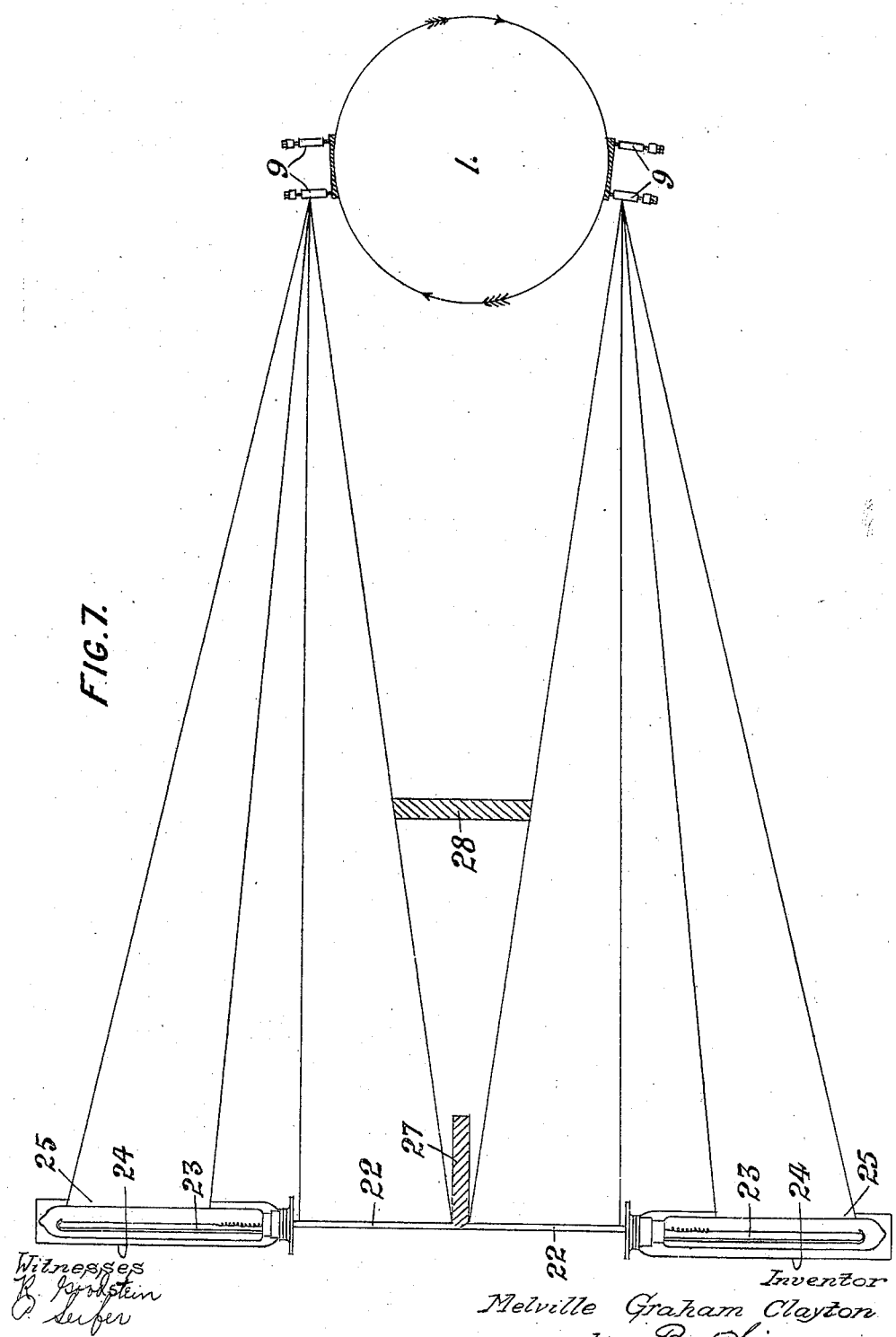

M. G. CLAYTON.
MEANS OR APPARATUS FOR DETERMINING AND INDICATING STRESS IN METAL BODIES.
APPLICATION FILED DEC. 24, 1909.
996,314.
Patented June 27, 1911.
7 SHEETS—SHEET 4.
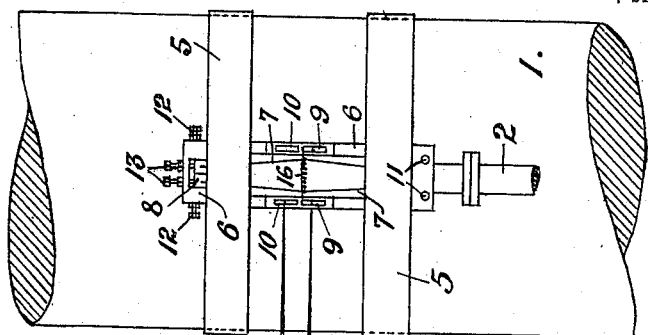
FIG.8.
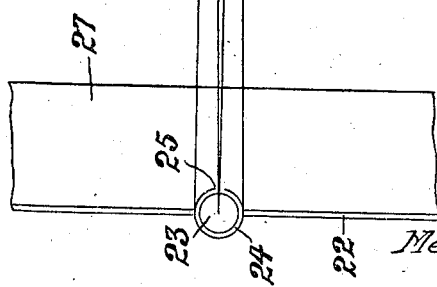
Witnesses
Inventor
Melville Graham
Clayton M. G. CLAYTON.
MEANS OR APPARATUS FOR DETERMINING AND INDICATING STRESS IN METAL BODIES.
APPLICATION FILED DEC. 24, 1909.
996,314.
Patented June 27, 1911.
7 SHEETS—SHEET 5.
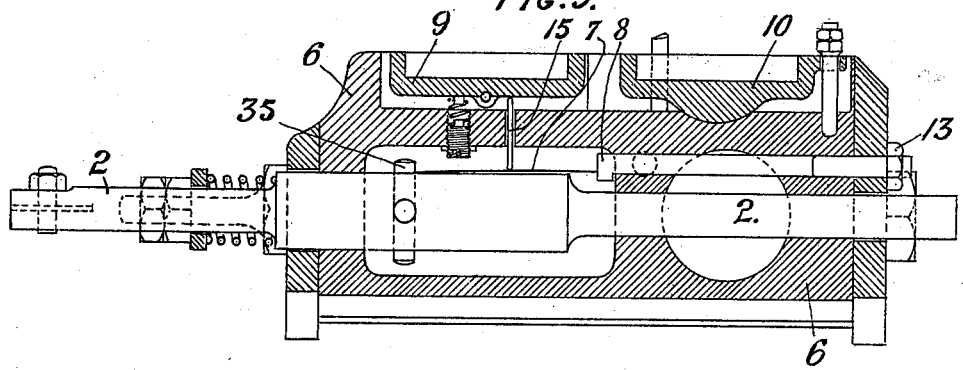
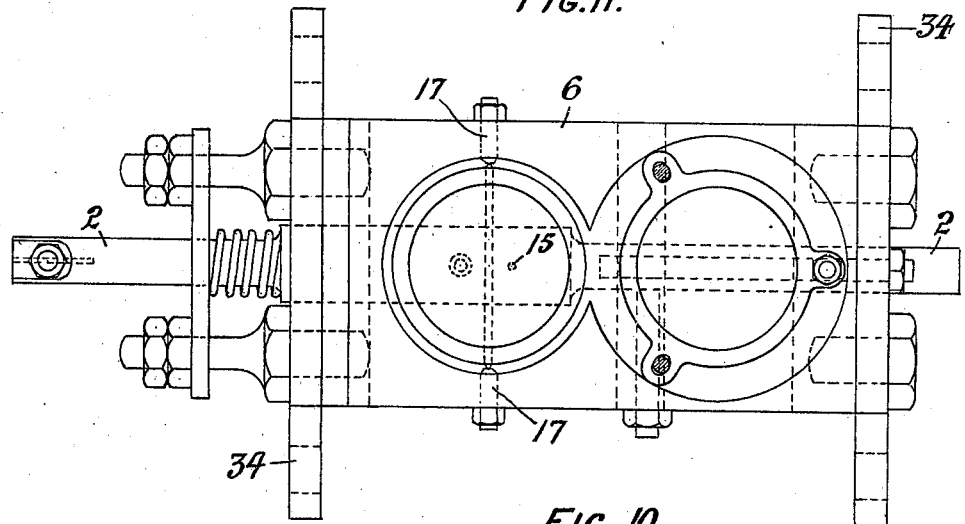
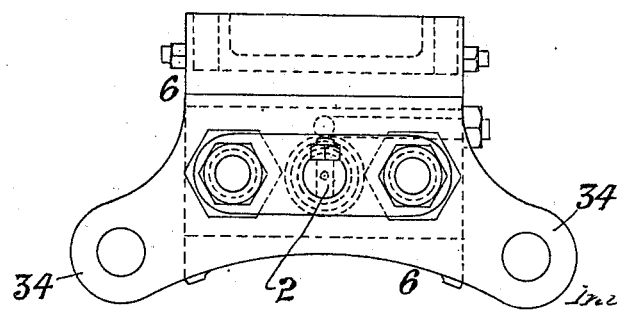
Witnesses
R. Hoorstein
E. Schallinger
Inventor
Melville Graham Clayton
by B. Singer
Atty M. G. CLAYTON.
MEANS OR APPARATUS FOR DETERMINING AND INDICATING STRESS IN METAL BODIES.
APPLICATION FILED DEC. 24, 1909.
996,314.
Patented June 27, 1911.
7 SHEETS—SHEET 6.
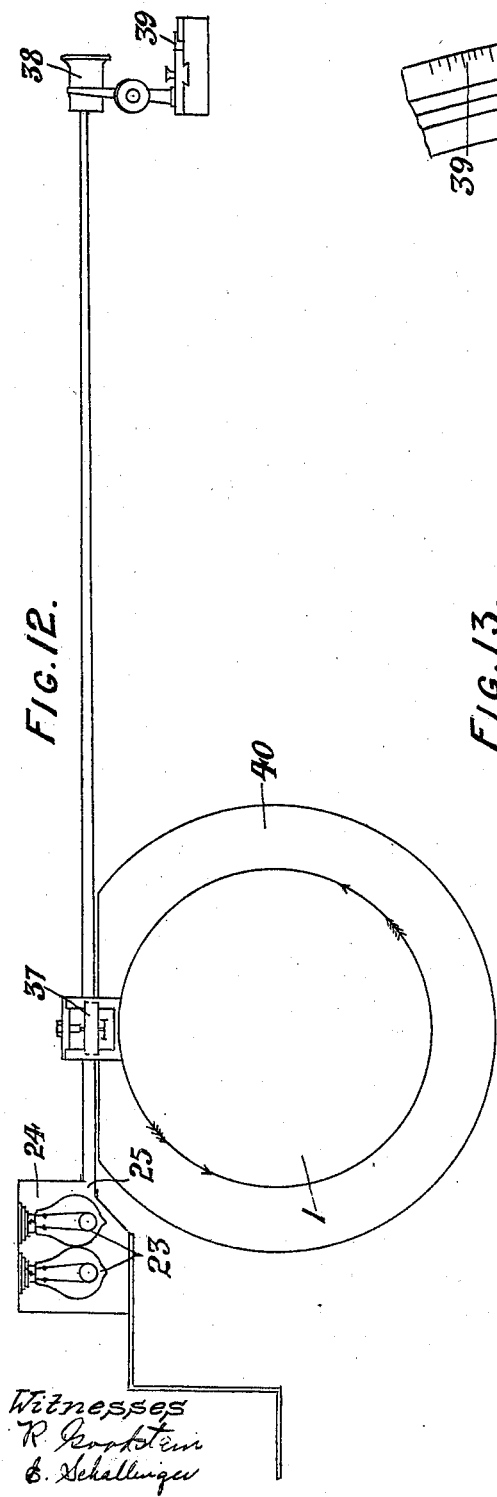
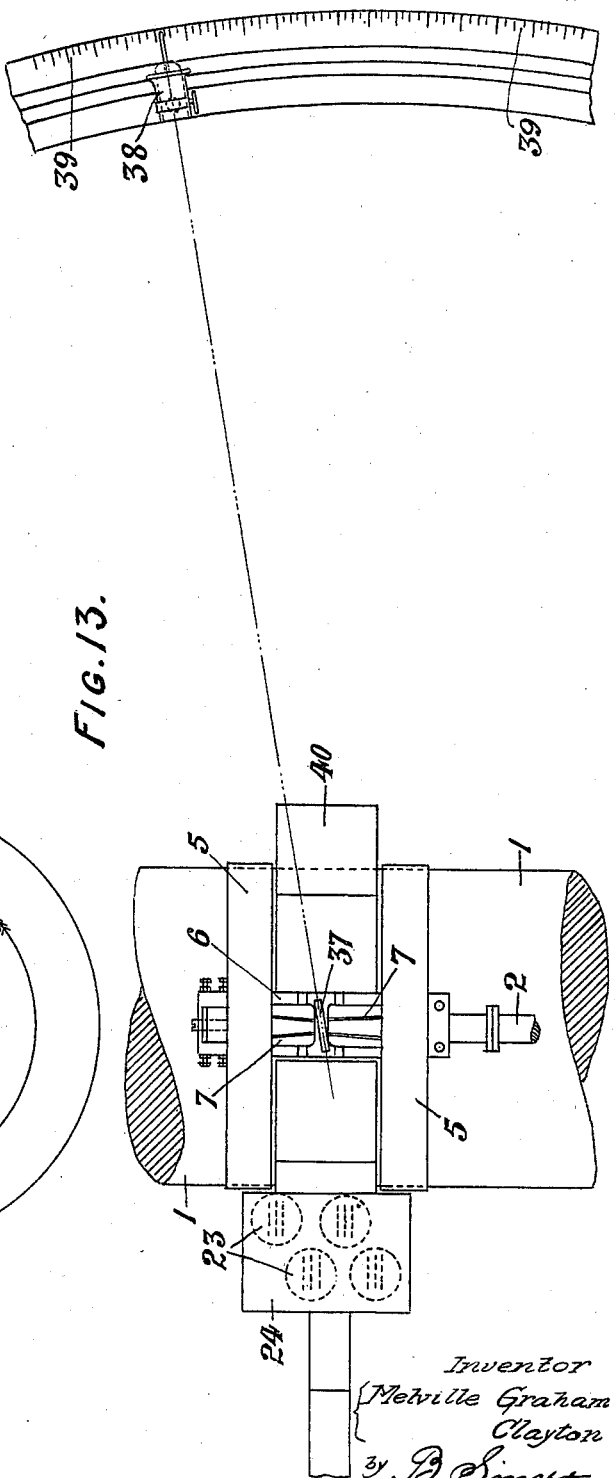

M. G. CLAYTON.
MEANS OR APPARATUS FOR DETERMINING AND INDICATING STRESS IN METAL BODIES.
APPLICATION FILED DEC. 24, 1909.
996,314.
Patented June 27, 1911.
7 SHEETS—SHEET 7.
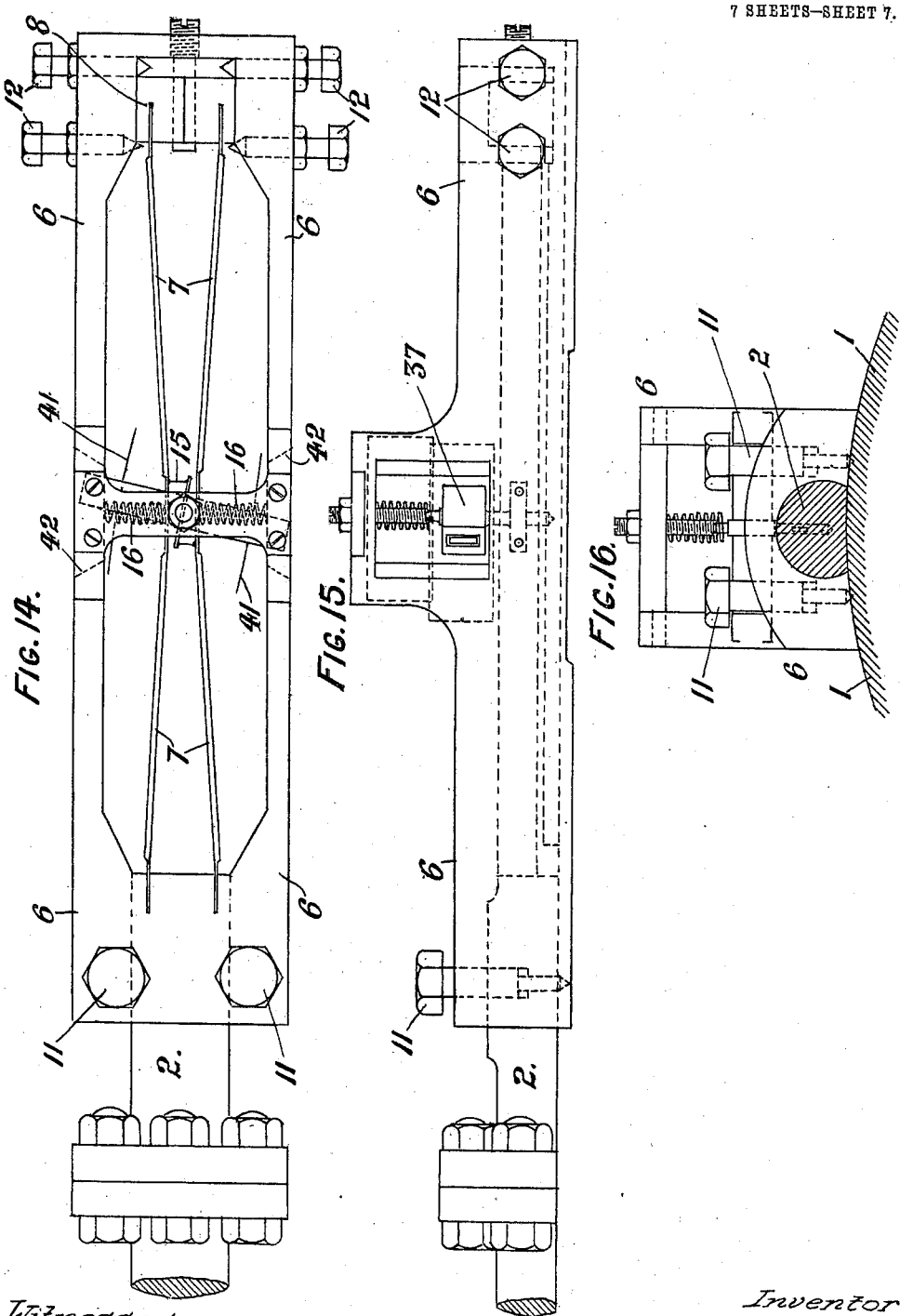

UNITED STATES PATENT OFFICE.

MELVILLE GRAHAM CLAYTON, OF WALLASEY, ENGLAND, ASSIGNOR OF ONE-HALF TO RESTAL RATSEY BEVIS, OF BIRKENHEAD, ENGLAND.

MEANS OR APPARATUS FOR DETERMINING AND INDICATING STRESS IN METAL BODIES.

996,314. Specification of Letters Patent. Patented June 27, 1911.

Application filed December 24, 1909. Serial No. 534,845.

*To all whom it may concern:*

Be it known that I, MELVILLE GRAHAM CLAYTON, a subject of the King of England, residing at Wallasey, in the county of Chester, England, have invented new and useful Improvements in Means or Apparatus for Determining and Indicating Stress in Metal Bodies, of which the following is a specification.

This invention has reference to means for determining and indicating stresses applied to shafts, and has chiefly for its object to provide such a means which is simple and inexpensive, and is not liable to become deranged or defective under large stresses or weights.

In the following description, the improvements hereunder are comprised, and the drawings annexed illustrate examples of the manner of carrying out the invention.

The change of dimension, rectilinearly, of a shaft, bar or other metallic body, when put under stress due to pressure thereto applied, is adapted, through means as hereinafter described, to determine and indicate the amount of such pressure or weight; and in one application, the change of length of a shaft which is under longitudinal or axial pressure or stress due to the thrust of a ship's propeller, or other longitudinally directed force, is, through the means referred to, adapted to indicate upon a suitable indicating, or indicating and recording mechanism, the said thrust. In the case of the invention being applied to determining and indicating longitudinal thrust on a shaft or column by pressure applied to it longitudinally, as takes place in a ship's propeller shaft, at a certain point along the shaft there is connected to it a rod or bar; and at another point on the shaft there is applied and fitted the indicating instrument proper, which is adapted to determine and indicate longitudinal movement in the shaft or body, and the amount of same in any suitable terms, such as tons or other weight, horse-power, or other symbolism. And within this instrument a bar or strip of metal, say spring metal of flat thin form, is placed, a part of which between its ends—which are fixed in suitable carriers or supports—is out of the line in which the two ends lie, but only a small amount of the same; and the carrier or support of one end of such bar or strip is connected with the rod or bar fixed in the shaft at another point; and when the shaft is under compressive thrust between the two points referred to, the shortening will be transmitted to the said movable spring parts through the bar, and the amount of movement transmitted by the said bar to the strips or plates, will, in their movement from the line in which their ends lie (which is parallel with the axis of the shaft), be multiplied; and this magnified or multiplied movement is transmitted to an indicating or recording device, or both, and is thereby indicated.

In the drawings, Figure 1 is a longitudinal elevation showing the application of the invention to the determining and indicating of the longitudinal thrust in a shaft, which may be assumed to be a ship's propeller shaft; and Figs. 2 and 3 are cross sections of same. Figs. 4, 5 and 6, are respectively plan, end view and longitudinal side elevation of the parts on the shaft shown in Fig. 1, by which the indications of the action of the apparatus are effected; and Figs. 7 and 8 are end view and plan, showing the complete indicating means. Figs. 9, 10, 11, are sectional elevation, end, and plan view, respectively, showing details of a modified form of indicating parts or means; Figs. 12 and 13 are an end elevation and plan showing generally, another modified indicating means; and Figs. 14, 15, and 16, are respectively, plan, side elevation, and end view of the details of the arrangement shown in Figs. 12 and 13.

Referring to the drawings, and more particularly to Figs. 1 to 6, 1 is the shaft in which the change of dimension longitudinally, say the decrease, due to a longitudinal thrust upon it, is to be determined and indicated; and 2 is the bar or rod connected with it, by which this change of longitudinal dimension is transmitted to the indicating apparatus. One end of the bar or rod 2 is fixed to the shaft 1 by a block 3 in which it is suitably secured, the block being fastened onto the shaft by a clamping band 4; while the other end of the bar 2 is directly and rigidly connected to a flexible or moving part of the indicating apparatus proper, which is fastened on the shaft 1 by clamping bands 5. The indicating device is attached to the bar 2 by forming slots in the end of this bar and introducing the ends of the indicating device thereinto; these ends are rigidly fixed to this bar 2, either by means of rivets passing through both parts or by any other means.

The indicating apparatus proper, which is shown generally in Fig. 1, is illustrated in detail in Figs. 4 to 8; and it comprises a frame 6, the underside of which is of the curvature of the shaft 1, and rests upon it; two strips of metal 7, say spring metal of flat thin form, rigidly fastened at one end to the end of the shaft 2, and at the other to a block 8 fitted in the opposite end of the frame 6; and two sets of mirrors 9, 10, 9 being a tilting or oscillating mirror, and 10 a stationary, but adjustable mirror. The strips 7 have a longitudinal corrugation, as shown, between their ends and the center, so that they only bend, in working, at the ends and the center. The end of the frame 6 through which the bar 2 passes, is provided with a set of stud bolts 11, the inner ends of which are adapted to act on the shaft 1 for setting it; while the blocks 8 at the other end, in which the outer ends of the strips 7 are fixed, are provided with holding or clamping screw studs 12, and set screws 13. The strips 7 are normally pressed apart by springs 16 placed between them and held under suitable compression. The tilting mirrors 9 are connected up with the center of the strips 7 by pins 15, which impart the lateral motion of the strips 7, to the mirrors. The mirrors 9 are supported and tilt or vibrate upon pivots 17; and the mirrors 10 are also supported on pivots 18, upon which they can be adjusted; and they are adapted to be clamped by nuts 20 on the upper threaded pivot 19, or other suitable means. When the shaft 1 is under compressive thrust between the two fixed points referred to, namely, the point at which the clamps 4 and 5 come, respectively, the resultant shortening of it will, through the rod or bar 2, be transmitted to the movable spring parts 7, which are wider apart at their center than their ends at which they are fixed; and the amount of movement transmitted by the said bar 2 to the strips or plates 7, will, in their movement from the line in which their ends lie (which is parallel with the axis of the shaft 1), be magnified or multiplied; and this magnified or multiplied movement is transmitted to the tilting mirrors 9, and the indicating means.

The indicating means in the arrangement shown in Figs. 7 and 8, consists of a vertical screen 22, carrying above and below it (in the same vertical plane as the mirrors 9 and 10) electric lamps 23, inclosed in cases 24, each having a vertical slit 25 in it, through which the light can be projected. The projected beam of light strikes the mirrors 9 and 10, and is reflected by same onto the screen 22 from both sides of the shaft. The angle of the reflected light from the stationary mirror 10, will, after setting the mirror, be constant, while that reflected from the tilting mirror 9, will vary according to the angle at which it stands at any and every movement in relation to the axis of the shaft 1; and it will be reflected onto the screen 22 at varying angles according to the thrust on the shaft 1, and the longitudinal variations of length of this shaft between the fixed end of the bar 2 and the strips 7. The point, therefore, at which the two rays of light from the fixed mirrors 10 and the tilting mirrors 9, strike the screen 22. can be observed, and the distance apart will represent the variations of length of the shaft, and the longitudinal thrust exerted on it, say by the propeller of a ship; and, hence, in using the apparatus for ascertaining the horse power at any moment of time, the distances apart of the rays striking the screen 22 from the mirrors may be taken as the measure of such power. As is shown by the drawings, there are two sets of mirrors 9 and 10, that is, one set on each side of the frame 6; and one of these sets will act when the apparatus is above the shaft axis, while the other set will be in action when the apparatus is at the underside of the axis; so that two flashing and indicating acts take place in each revolution of the shaft. A horizontal division plate 27 is provided on the face of the screen 22, to divide it into two parts; and, furthermore, a vertical opaque screen 28 will be provided between the shaft and screen 22, if required, to limit the light rays striking the screen when both sets of mirrors are being employed.

In the case of the application of the apparatus to ships' propeller shafts, it is preferred to inclose the bar 2 in a heat insulating lagging, as the temperature of the shaft varies—i. e., gets warm in work, and it is desirable that the bar 2 should be at the same temperature so as to contract and expand with it. The lagging is marked 30 in Fig. 2, and it is held within a sheet metal casing 31 for the whole length of the bar 2; and the inner face of the bar 2 rests and moves in contact with the shaft 1, and is held in place thereon by bearings 32, disposed at intervals. The casing, lagging, and bearings are held in position by the clamping straps 33. This arrangement insures the bars 2 being maintained as far as possible at the temperature of the shaft 1.

In Figs. 9 to 11, a modification of mirror carrier and arrangement is shown. In this case, the carrier frame 6 is fixed on saddle straps 34, which are adapted to be secured to the shaft 1 by clamping bands; and the axes of the mirrors 9 and 10 are placed at right angles to the radius of the shaft. These mirrors are placed and mounted horizontally in relation to the frame 6, and the bar 2 enters the frame 6, and is provided with a projection 35 within it, against which one end of the bent strip 7 rests; while the other end of this strip rests against a block piece 8, which is adjustable longitudinally by the screw studs 13; and motion is transmitted from the curved or bent strip 7 to the tilting mirror 9 by the pin 15. It will be seen therefore that the action on the mirrors in this case is practically the same as that above described with reference to Figs. 1 to 8.

In the case shown in Figs. 12 to 16, the bent or curved flexible bars or strips 7 are adapted to operate upon a tubular device 37, mounted on an axis radial to the shaft axis; and the rotation of which (the amount of which is multiplied or increased from the movement of said elastic bars or strips) serves to enable observations to be made through a tubular eye-piece 38 outside it, and to read upon a stationary scale or index 39—over which the eye-piece 38 may work—the figure or degree which the rotatable tube 37 is in line with, and which may represent power or thrust, or the like. The illumination by which light through the tube 37 can be seen from the eye-piece 38, is produced preferably by electric lamps 23 in a casing 24, which has a horizontal aperture 25 in it, in line with the axis of the tube 37 when in the upper position, and with the eye-piece 38; so that when in taking observations, the tube 37 is tilted by the longitudinal contraction of the shaft, and the eye-piece 38 is moved so as to be in line with the aperture of the tube 37, the light behind the tube will be seen; and when it is seen, the position at which the tube 37 will stand on the scale 39 will be the correct position, and readings can be taken from it. A wooden screen 40 is provided on the shaft 1 at one point—namely in line with the bottom of the aperture through the tube 37—parallel therewith, so that the light from the lamps 23 can only be seen from the eye-piece 38 through the tube 37 when this cut-away part of the screen 40 is in the upper horizontal position, and parallel with the line extending between the lamps and eye-piece 38. The pivoted tubular device 37 is provided with extending arms which are connected with the flexible strips through suitable links or connecting pieces, such as those designated 15, Fig. 14; and this tubular device has screens 41 connected with and carried by it; and its ends project into and work in apertures in the frame 6, and the width of which is shown by the dotted line 42; and the screens being behind or within these openings, the light from the illuminating case 24, cannot pass to the eye-piece 38 except through the tube 37 itself, the aperture of which is narrow and relatively deep, as shown in Figs. 14 and 15.

With regard to the several forms and constructions of parts herein shown and described, the invention is not restricted to them, as the motion of the primary moved parts or bars may be transmitted, multiplied, and indicated in any suitable way; and in different applications, they will necessarily be arranged and modified to suit the conditions of same.

What is claimed is:—

1. Apparatus for determining and indicating pressure applied longitudinally to a shaft, comprising the combination of a shaft, a bar having one end free and the other attached to the shaft, a flexible bowed strip having one end attached to the free end of the bar and the other end attached to the shaft, and means connected with the strip for indicating movements of the strip caused by increase or decrease in the length of the shaft.

2. Apparatus for determining and indicating the stress in metal shafts comprising the combination of a shaft, a bar connected at one end thereto, a flexible bowed strip device also fixed on said shaft and connected with the free end of the bar, a source of light means connected with the said strip and operating in conjunction with the source of light for indicating variations in the length of the shaft, substantially as set forth.

3. Apparatus for determining and indicating the stress in metal rotary shafts, comprising the combination of a shaft; a bar connected at one end thereto; a source of light; a movable indicating device connected at one end with the said shaft, and at the other end with the said bar, and operating in conjunction with the source of light, and an indicating device comprising motion multiplying mechanism and a device coöperating with the source of light.

4. In apparatus for determining and indicating the stress in rotary shafts, the shaft 1; a bar 2 fixed at one end thereto and revolving therewith and lying parallel thereon, in contact therewith; a thin metal strip 7 one end of which is connected to the bar 2 and the other to the shaft, having a part between these ends out of the plane in which the ends lie; and indicating means connected with the metal strip; substantially as set forth.

5. Apparatus for determining and indicating stress in metal rotary shafts, the shaft 1; a bar 2 fixed at one end thereto and revolving therewith and lying parallel thereto;

a thin metal strip 7 having one end connected to the bar 2 and the other to the shaft, and having a part between these ends out of the plane passing through the ends; and a mirror carried by the shaft and adapted to be moved by said strip 7; substantially as set forth.

In testimony whereof I affix my signature in presence of two witnesses.

MELVILLE GRAHAM CLAYTON.

Witnesses:
SOMERVILLE GOODALL,
DONALDSON P. COULTER.

Copies of this patent may be obtained for five cents each, by addressing the "Commissioner of Patents, Washington, D. C."